(12) United States Patent
Tochio et al.

(10) Patent No.: US 11,616,227 B2
(45) Date of Patent: Mar. 28, 2023

(54) METHOD FOR MANUFACTURING POSITIVE ELECTRODE ACTIVE MATERIAL FOR NON-AQUEOUS ELECTROLYTE SECONDARY BATTERY

(71) Applicant: Panasonic Intellectual Property Management Co., Ltd., Osaka (JP)

(72) Inventors: Takaya Tochio, Osaka (JP); Toshinobu Kanai, Hyogo (JP); Takeshi Ogasawara, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 230 days.

(21) Appl. No.: 16/957,180

(22) PCT Filed: Dec. 12, 2018

(86) PCT No.: PCT/JP2018/045667
§ 371 (c)(1),
(2) Date: Jun. 23, 2020

(87) PCT Pub. No.: WO2019/131129
PCT Pub. Date: Jul. 4, 2019

(65) Prior Publication Data
US 2020/0335780 A1    Oct. 22, 2020

(30) Foreign Application Priority Data

Dec. 28, 2017    (JP) .............................. JP2017-253579

(51) Int. Cl.
| | |
|---|---|
| *H01M 4/505* | (2010.01) |
| *H01M 4/04* | (2006.01) |
| *H01M 4/525* | (2010.01) |
| *H01M 10/0525* | (2010.01) |
| *H01M 10/0568* | (2010.01) |
| *H01M 10/0569* | (2010.01) |
| *H01M 50/409* | (2021.01) |

(52) U.S. Cl.
CPC ........ *H01M 4/505* (2013.01); *H01M 4/0471* (2013.01); *H01M 4/525* (2013.01); *H01M 10/0525* (2013.01); *H01M 10/0568* (2013.01); *H01M 10/0569* (2013.01); *H01M 50/409* (2021.01); *H01M 2300/0028* (2013.01)

(58) Field of Classification Search
None
See application file for complete search history.

(56) References Cited

U.S. PATENT DOCUMENTS

| | | | |
|---|---|---|---|
| 2015/0228974 A1 | 8/2015 | Kokado et al. | |
| 2017/0054147 A1 | 2/2017 | Yokoyama et al. | |
| 2017/0352885 A1 | 12/2017 | Kondo et al. | |
| 2018/0226646 A1 | 8/2018 | Furuichi et al. | |
| 2018/0316008 A1 | 11/2018 | Arimura et al. | |
| 2018/0337403 A1* | 11/2018 | Komukai | ............... C01G 53/42 |

FOREIGN PATENT DOCUMENTS

| | | |
|---|---|---|
| JP | 2012-079464 A | 4/2012 |
| JP | 2015-216105 A | 12/2015 |
| JP | 2016-127004 A | 7/2016 |
| JP | 2017-84513 A | 5/2017 |
| WO | 2017/018099 A1 | 2/2017 |
| WO | 2017/078136 A1 | 5/2017 |

OTHER PUBLICATIONS

International Search Report dated Mar. 12, 2019, issued in Application No. PCT/JP2018/045667 (2 pages).

* cited by examiner

*Primary Examiner* — Alix E Eggerding
(74) *Attorney, Agent, or Firm* — WHDA, LLP

(57) ABSTRACT

The method for manufacturing a positive electrode active material for a non-aqueous electrolyte secondary battery according to one embodiment of the present invention comprises: a first step for adding an alkaline solution having a tungsten compound dissolved therein to a lithium-metal composite oxide powder represented by general formula $Li_zNi_{1-x-y}Co_xM_yO_2$ (where $0 \le x \le 0.1$, $0 \le y \le 0.1$, and $0.97 \le z \le 1.20$ are satisfied, and M is at least one type of element selected from among Mn, W, Mg, Mo, Nb, Ti, Si, and Al), and mixing same; and a second step for heating the mixture of the alkaline solution and the lithium-metal composite oxide powder at 100-600° C., wherein the amount of the alkaline solution to be added in the first step is 0.1-10 mass % with respect to the amount of the lithium-metal composite oxide powder.

3 Claims, No Drawings

METHOD FOR MANUFACTURING POSITIVE ELECTRODE ACTIVE MATERIAL FOR NON-AQUEOUS ELECTROLYTE SECONDARY BATTERY

TECHNICAL FIELD

The present disclosure relates to a method for producing a positive electrode active material for a non-aqueous electrolyte secondary battery.

BACKGROUND ART

Secondary batteries such as lithium ion secondary batteries are one of non-aqueous electrolyte secondary batteries, and are utilized in wide fields of mobile phones, digital cameras, notebook PC, hybrid vehicles, electric vehicles, and the like. Lithium ion secondary batteries are mainly those with lithium metal oxide used as a positive electrode active material and a carbon material such as graphite used as a negative electrode active material.

For example, Patent Literature 1 discloses, as a method for producing a positive electrode active material, a method for producing a positive electrode active material for a non-aqueous electrolyte secondary battery, the method involving adding and mixing an alkali solution in which a tungsten compound is dissolved, to and with a lithium metal composite oxide powder made of primary particles represented by general formula $Li_zNi_{1-x-y}Co_xM_yO_2$ (wherein $0.10 \leq x \leq 0.35$, $0 \leq y \leq 0.35$ and $0.97 \leq z \leq 1.20$, and M is at least one element selected from the group consisting of Mn, V, Mg, Mo, Nb, Ti and Al) and secondary particles formed by aggregation of the primary particles, and thermally treating the resulting mixture, thereby forming fine particles including W and Li on surfaces of the primary particles of the lithium metal composite oxide powder.

For example, Patent Literature 2 discloses a method for producing a positive electrode active material for a non-aqueous electrolyte secondary battery, the method involving thermally treating a tungsten mixture obtained by mixing a tungsten compound powder containing no lithium with a lithium metal composite oxide powder made of primary particles represented by general formula $Li_zNi_{1-x-y}Co_xM_yO_2$ (wherein $0 \leq x \leq 0.35$, $0 \leq y \leq 0.35$ and $0.95 \leq z \leq 1.30$, and M is at least one element selected from the group consisting of Mn, V, Mg, Mo, Nb, Ti and Al) and secondary particles formed by aggregation of the primary particles, thereby forming a lithium tungstate compound on surfaces of the primary particles of such lithium metal composite oxide.

CITATION LIST

Patent Literatures

PATENT LITERATURE 1: Japanese Unexamined Patent Application Publication No. 2012-79464
PATENT LITERATURE 2: Japanese Unexamined Patent Application Publication No. 2016-127004

SUMMARY

Meanwhile, any lithium metal composite oxide having a high proportion of nickel and a proportion of cobalt of 10 mol % or less ($0 \leq x \leq 0.1$ in terms of the above general formula) is an excellent positive electrode active material, but has the problem of a reduction in discharge capacity at a low temperature.

In general, discharge capacity at a low temperature is improved by forming particles including W and Li on surfaces of primary particles of lithium metal composite oxide. However, discharge capacity at a low temperature is not almost improved even by forming particles including W and Li on surfaces of primary particles of lithium metal composite oxide having a high proportion of nickel and a proportion of cobalt of 10 mol % or less, according to the method disclosed in each of Patent Literatures 1 and 2.

It is an advantage of the present disclosure to provide a method for producing a positive electrode active material for a non-aqueous electrolyte secondary battery, which enables discharge capacity at a low temperature to be improved even in use of lithium metal composite oxide having a high proportion of nickel and a proportion of cobalt of 10 mol % or less.

A method for producing a positive electrode active material for a non-aqueous electrolyte secondary battery according to one aspect of the present disclosure comprises a first step of adding and mixing an alkali solution in which a tungsten compound is dissolved, to and with a lithium metal composite oxide powder made of primary particles represented by general formula $Li_zNi_{1-x-y}Co_xM_yO_2$, wherein $0 \leq x \leq 0.1$, $0 \leq y \leq 0.1$ and $0.97 \leq z \leq 1.20$, and M is at least one element selected from the group consisting of Mn, W, Mg, Mo, Nb, Ti, Si and Al, and secondary particles formed by aggregation of the primary particles, and a second step of thermally treating the alkali solution and the lithium metal composite oxide powder mixed, thereby forming particles including W and Li on surfaces of the primary particles of the lithium metal composite oxide powder, wherein an amount of the alkali solution to be added in the first step is 0.1 to 10% by mass relative to the lithium metal composite oxide powder.

According to one aspect of the present disclosure, a positive electrode active material for a non-aqueous electrolyte secondary battery is obtained which enables discharge capacity at a low temperature to be improved.

DESCRIPTION OF EMBODIMENTS

Any lithium metal composite oxide made of primary particles represented by general formula $Li_zNi_{1-x-y}Co_xM_yO_2$ (wherein $0 \leq x \leq 0.1$, $0 \leq y \leq 0.1$ and $0.97 \leq z \leq 1.20$, and M is at least one element selected from the group consisting of Mn, W, Mg, Mo, NbTi, Si and Al) and secondary particles formed by aggregation of the primary particles is an excellent positive electrode active material, for example, from the viewpoint of enabling the energy density of a non-aqueous electrolyte secondary battery to be increased, but has the problem of a reduction in discharge capacity at a low temperature (for example, −10° C. or less). It is considered for an improvement in discharge capacity at a low temperature to form particles including W and Li on surface of primary particles of such lithium metal composite oxide. Since particles including W and Li are high in lithium ion conductivity, particles including W and Li are formed on surfaces of such primary particles, resulting in a reduction in reaction resistance of such lithium metal composite oxide and an improvement in discharge capacity at a low temperature.

The method involving mixing a lithium metal composite oxide powder and a tungsten compound powder and thermally treating the mixture, as in the technique of Patent Literature 2, however, hardly allows the tungsten compound powder to be dispersed in the secondary particles and thus hardly allows particles including W and Li to be formed on surfaces of the primary particles in the secondary particles, thereby not enabling discharge capacity at a low temperature to be sufficiently improved. The method involving adding and mixing an alkali solution in which a tungsten compound is dissolved, to and with a lithium metal composite oxide powder, as in the technique of Patent Literature 1, enables the alkali solution to be dispersed into the secondary particles and thus enables particles including W and Li to be formed on surfaces of the primary particles in the secondary particles. The present inventors, however, have made studies, and as a result, have found that a large amount of the alkali solution to be added, in use of lithium metal composite oxide having a high proportion of nickel and a proportion of cobalt of 10 mol % or less as in general formula $Li_zNi_{1-x-y}Co_xM_yO_2$ (wherein $0≤x≤0.1$, $0≤y≤0.1$ and $0.97≤z≤1.20$, and M is at least one element selected from the group consisting of Mn, W, Mg, Mo, Nb, Ti, Si and Al), causes Li in the lithium metal composite oxide to be excessively eluted toward the alkali solution, resulting in an increase in resistivity of the lithium metal composite oxide by itself and not enabling discharge capacity at a low temperature to be sufficiently improved. The present inventors have then proceeded with additional studies, and have conceived a method for producing a positive electrode active material for a non-aqueous electrolyte secondary battery according to an aspect shown below.

A method for producing a positive electrode active material for a non-aqueous electrolyte secondary battery according to the present embodiment comprises a first step of adding and mixing an alkali solution in which a tungsten compound is dissolved, to and with a lithium metal composite oxide powder made of primary particles represented by general formula $Li_zNi_{1-x-y}Co_xM_yO_2$ (wherein $0≤x≤0.1$, $0≤y≤0.1$ and $0.97≤z≤1.20$, and M is at least one element selected from the group consisting of Mn. W, Mg, Mo, NbTi. Si and Al) and secondary particles formed by aggregation of the primary particles, and a second step of thermally treating the alkali solution and the lithium metal composite oxide powder mixed, thereby forming particles including W and Li on surfaces of the primary particles of the lithium metal composite oxide powder, wherein the amount of the alkali solution to be added in the first step is 0.1 to 0% by mass relative to the lithium metal composite oxide powder. Thus, the predetermined amount of the alkali solution in which a tungsten compound is dissolved is added to and mixed with the lithium metal composite oxide powder, thereby not only allowing the alkali solution to be dispersed into the secondary particles of lithium metal composite oxide, but also inhibiting Li in lithium metal composite oxide from being excessively eluted toward the alkali solution. That is, the production method according to the present embodiment allows excess elution of Li in lithium metal composite oxide to be suppressed and also allows particles including W and Li to be formed on the surfaces of primary particles in the secondary particles, thereby providing a positive electrode active material for a non-aqueous electrolyte secondary battery, which enables a reduction in discharge capacity at a low temperature to be suppressed.

Hereinafter, the method for producing a positive electrode active material for a non-aqueous electrolyte secondary battery according to the present embodiment will be described with respect to each step in detail.

[First Step]

The first step is a step of adding and mixing a predetermined amount of an alkali solution in which a tungsten compound is dissolved (hereinafter, referred to the alkali solution in which a tungsten compound is dissolved, as "alkali solution (W)".), to and with a lithium metal composite oxide powder made of primary particles and secondary particles formed by aggregation of the primary particles. Thus, the alkali solution (W) can be brought into contact with not only surfaces of the primary particles, exposed on the outer surfaces of the secondary particles of the lithium metal composite oxide powder, but also surfaces of the primary particles in the secondary particles.

The lithium metal composite oxide powder here used is a lithium metal composite oxide powder made of primary particles represented by general formula $Li_zNi_{1-x-y}Co_xM_yO_2$ (wherein $0≤x≤0.1$, $0≤y≤0.10$ and $0.97≤z≤1.20$, and M is at least one element selected from the group consisting of Mn, W, Mg, Mo, Nb, Ti, Si and Al) and secondary particles formed by aggregation of the primary particles. In the general formula, x is preferably $0≤x≤0.06$ and furthermore y is more preferably $0≤y≤0.06$ from the viewpoint of, for example, achievement of an increase in energy density of a non-aqueous electrolyte secondary battery.

The lithium metal composite oxide powder is preferably made of primary particles and secondary particles formed by aggregation of the primary particles and the secondary particles preferably have voids and grain boundaries through which an electrolytic solution can penetrate, from the viewpoint of, for example, an enhancement in output characteristics of a non-aqueous electrolyte secondary battery. The average particle size of the primary particles is, for example, preferably 500 nm or less, more preferably in the range from 50 nm to 300 nm. The average particle size of the primary particles is obtained by determining the respective longer diameters of ten of the primary particles in a cross-sectional SEM image of the particles and calculating the average value thereof. The average particle size of the secondary particles is, for example, preferably in the range from 1 μm to 50 μm, more preferably in the range from 5 μm to 20 μm. The average particle size of the secondary particles is the volume average particle size measured by a laser diffraction method.

The alkali solution (W) may be prepared by, for example, adding and dissolving a tungsten compound with stirring of an alkali solution by use of a reaction tank equipped with a stirrer. The tungsten compound is preferably completely dissolved in the alkali solution in terms of dispersing uniformity.

The tungsten compound here used may be any one soluble in the alkali solution, and is preferably a tungsten compound easily soluble in alkali, such as tungsten oxide, lithium tungstate or ammonium tungstate.

The amount of tungsten to be dissolved in the alkali solution is preferably an amount necessary for formation of particles including W and Li on surfaces of the primary particles of lithium metal composite oxide, and is, for example, 0.01 to 1.0 mol % relative to the total molar amount of nickel, cobalt and M included in the lithium metal composite oxide.

The concentration of tungsten in the alkali solution (W) is, for example, preferably 0.05 mol/L or more, more preferably 0.05 to 2 mol/l. A case where the concentration is less than 0.05 mol/l may cause the amount of particles including W and Li, formed on surfaces of the primary particles, to be decreased due to such a low concentration of tungsten, and cause discharge capacity at a low temperature to be reduced as compared with a case where the above range is satisfied.

The alkali for use in the alkali solution is preferably a common alkali solution including no harmful impurities for a positive electrode active material, from the viewpoint that, for example, a high charge/discharge capacity is achieved.

Ammonia or lithium hydroxide, to which no impurities can be incorporated, is preferably used, and lithium hydroxide is particularly preferably used. When lithium hydroxide is used, the amount of lithium hydroxide is preferably 1.5 to 10.0 at the atomic ratio to W. Such lithium hydroxide in this range is used to thereby facilitate formation of particles including W and Li on surfaces of the primary particles.

The alkali solution is preferably an aqueous solution from the viewpoint that, for example, the alkali solution (W) is dispersed in the secondary particles of lithium metal composite oxide. Although a solvent high in volatility, such as alcohol, is not inhibited from being used, such a solvent can be evaporated before penetration of the alkali solution (W) into the secondary particles.

The pH of the alkali solution may be any pH which allows the tungsten compound to be dissolved, and is preferably 9 to 12. A case where the pH is less than 9 may cause the amount of elution of lithium in lithium metal composite oxide to be increased, and cause the effect of improving discharge capacity at a low temperature to be deteriorated as compared with a case where the above range is satisfied. A case where the pH is more than 12 may cause any alkali remaining in lithium metal composite oxide to be too excess and cause battery characteristics to be degraded.

The alkali solution (W) is preferably added and mixed, with stirring of the lithium metal composite oxide powder, in the first step. The amount of the alkali solution (W) to be added may be 0.1 to 10% by mass and is preferably 0.1 to 3.0% by mass relative to the lithium metal composite oxide powder, in order to decrease the amount of elution of lithium in lithium metal composite oxide. When the amount of the alkali solution (W) to be added is more than 10 mass relative to the lithium metal composite oxide powder, lithium in lithium metal composite oxide is excessively eluted and thus no improvement in discharge capacity at a low temperature can be sufficiently achieved due to, for example, an increase in the resistivity of lithium metal composite oxide by itself. When the amount of the alkali solution (W) to be added is less than 0.1% by mass relative to the lithium metal composite oxide powder, primary particles which cannot be brought into contact with the alkali solution (W) are increased. As a result, many primary particles on which no particles including W and Li are formed are present in a positive electrode active material finally obtained, and thus no improvement in discharge capacity at a low temperature can be sufficiently achieved.

The temperature of the alkali solution (W) being added to the lithium metal composite oxide powder is preferably in the range from 60° C. to 90° C. from the viewpoint of an improvement in discharge capacity at a low temperature. A case where the temperature of the alkali solution (W) is more than 90° C. may cause the alkali solution (W) to be rapidly dried, resulting in no sufficient dispersion (penetration) into the secondary particles. A case where the temperature of the alkali solution (W) is less than 60° C. may cause the solubility of W in the alkali solution to be reduced thereby causing particles including W and Li to be precipitated before sufficient dispersion into the secondary particles. That is, both the cases may cause many primary particles, on which no particles including W and Li are formed, to be present in a positive electrode active material finally obtained, and thus cause discharge capacity at a low temperature to be reduced as compared with a case where the temperature of the alkali solution (W) is 60° C. to 90° C.

A common mixing machine can be used to sufficiently mix the lithium metal composite oxide powder with the alkali solution (W) to such an extent that the shape of the powder is not broken, by mixing with the lithium metal composite oxide powder with spraying or dropping of the alkali solution (W). Such a common mixing machine which can be here used is, for example, T. K. HIVIS MIX, a shaker mixer, a Loedige mixer, a Julia mixer, or a V-blender.

A step of washing the lithium metal composite oxide powder with water may also be provided before the first step in the production method of the present embodiment, in order to enhance battery capacity and safety. Such water washing may be performed with known method and conditions, and may be performed as long as no battery characteristics are degraded due to elution of lithium from lithium metal composite oxide. In a case where such water washing is provided, the alkali solution (W) is preferably subjected to spraying and mixing, with only solid-liquid separation and no drying. In a case where mixing with the alkali solution (W) is made with only solid-liquid separation and no drying, the water content after mixing with the alkali solution (W) is preferably not more than the maximum water content in a mixture of the lithium metal composite oxide powder dried and the alkali solution (W). In a case where the water content is increased, lithium may be eluted from lithium metal composite oxide to result in deterioration in effect of improving discharge capacity at a low temperature. In a case where lithium metal composite oxide is washed with water and thereafter dried, and then mixed with the alkali solution (W), productivity may be deteriorated due to an increase in number of drying operations.

[Second Step]

The second step is a step of thermally treating the alkali solution (W) and the lithium metal composite oxide powder mixed. Thus, particles including W and Li can be formed on surfaces of the primary particles of lithium metal composite oxide, from W in the alkali solution (W) and Li in the alkali solution (W) or Li eluted from lithium metal composite oxide. The amount of the alkali solution (W) to be added is a proper amount as described above, and thus Li is inhibited from being excessively eluted from lithium metal composite oxide.

The thermal treatment method is not particularly limited, and is preferably any thermal treatment at a temperature of 100 to 600° C. in an oxygen atmosphere or a vacuum atmosphere in order to prevent electric characteristics from being degraded in use as a positive electrode active material for a non-aqueous electrolyte secondary battery. A case where the thermal treatment temperature is less than 100° C. may cause evaporation of water not to be sufficient, resulting in no sufficient formation of particles including W and Li on surfaces of the primary particles of lithium metal composite oxide. On the other hand, a case where the thermal treatment temperature is more than 600° C. may result in not only sintering of the primary particles of lithium metal composite oxide, but also formation of some of W into a solid solution with lithium metal composite oxide. That is, both the cases may cause the effect of improving discharge capacity at a low temperature to be deteriorated, as compared with a case where the thermal treatment temperature is 100 to 600° C.

The atmosphere in the thermal treatment is preferably an oxidizing atmosphere like an oxygen atmosphere, or a vacuum atmosphere, in order to avoid a reaction with moisture or carbon dioxide in the atmosphere. The thermal treatment time is not particularly limited, and is preferably 2 to 10 hours in order to sufficiently evaporate water in the alkali solution (W) and form particles including W and Li.

A non-aqueous electrolyte secondary battery according to the present embodiment is obtained by, for example, housing an electrode assembly formed by stacking or winding electrodes (positive electrode and negative electrode) and a separator, together with a non-aqueous electrolyte, into a housing such as a battery can or a laminate. The positive electrode, the negative electrode, the separator and the non-aqueous electrolyte in the present embodiment are, for example, as follows.

<Positive Electrode>

The positive electrode comprises, for example, a positive electrode current collector such as metal foil and a positive electrode active material layer formed on the positive electrode current collector. The positive electrode current collector which can be here used is, for example, any foil of a metal which is stable in the potential range of the positive electrode, such as aluminum, or any film obtained by placing such a metal on a surface layer.

A positive electrode mixture layer suitably includes a positive electrode active material, and others such as a conductive agent and a binder. The positive electrode can be produced by, for example, applying a positive electrode mixture slurry including a positive electrode active material, a conductive agent, a binder, and the like onto a positive electrode current collector, and drying and then rolling a coating film, thereby forming a positive electrode mixture layer on both surfaces of the positive electrode current collector.

The positive electrode active material includes a positive electrode active material for anon-aqueous electrolyte secondary battery, obtained by the above-mentioned production method according to the present embodiment. The positive electrode active material for a non-aqueous electrolyte secondary battery, obtained by the production method according to the present embodiment is, for example, a positive electrode active material comprising a lithium metal composite oxide powder made of primary particles represented by general formula $Li_zNi_{1-x-y}Co_xM_yO_2$ (wherein $0 \leq x \leq 0.1$, $0 \leq y \leq 0.10$ and $0.97 \leq z \leq 1.20$, and M is at least one element selected from the group consisting of Mn, W, Mg, Mo, NbTi, Si and Al) and secondary particles formed by aggregation of the primary particles, and particles including W and Li, formed on surfaces of the primary particles of the lithium metal composite oxide powder.

The conductive agent here used may be any one of or a combination of two or more of carbon powders such as carbon black, acetylene black, ketchen black, and graphite.

Examples of the binder include a fluoropolymer and a rubber-based polymer. Examples of the fluoropolymer include polytetrafluoroethylene (PTFE), polyvinylidene fluoride (PVdF), or any modified product thereof and examples of the rubber-based polymer include an ethylene-propylene-isoprene copolymer and an ethylene-propylene-butadiene copolymer. These may be used singly or in combinations of two or more kinds thereof.

<Negative Electrode>

The negative electrode comprises, for example, a negative electrode current collector such as metal foil and a negative electrode mixture layer formed on the negative electrode current collector. The negative electrode current collector which can be here used is, for example, any foil of a metal which is stable in the potential range of the negative electrode, such as copper, or any film obtained by placing such a metal on a surface layer. The negative electrode mixture layer suitably includes a negative electrode active material, and others such as a thickener and/or a binder. The negative electrode may be produced by, for example, applying a negative electrode mixture slurry obtained by dispersing a negative electrode active material, a thickener, and a binder in water at a predetermined weight ratio, onto a negative electrode current collector, and drying and then rolling a coating film, thereby forming a negative electrode mixture layer on both surfaces of the negative electrode current collector.

The negative electrode active material which can be here used is any carbon material which can occlude and release lithium ions, and is, for example, non-graphitizable carbon, graphitizable carbon, fibrous carbon, cokes, and carbon black, besides graphite. A non-carbon-based material which can be here used is silicon, tin, or an alloy or oxide mainly made thereof.

The binder which can be here used is, for example, PTFE, as in the case of the positive electrode, and a styrene-butadiene copolymer (SBR) or a modified product thereof may also be used. The thickener which can be here used is, for example, carboxymethylcellulose (CMC).

<Non-Aqueous Electrolyte>

The non-aqueous solvent (organic solvent) of the non-aqueous electrolyte, which can be here used, is any of carbonates, lactones, ethers, ketones, esters, and the like, and a mixture of two or more of such solvents may be used. For example, any of cyclic carbonate such as ethylene carbonate, propylene carbonate or butylene carbonate, linear carbonate such as dimethyl carbonate, ethyl methyl carbonate or diethyl carbonate, or a mixed solvent of cyclic carbonate and linear carbonate can be used.

The electrolyte salt of the non-aqueous electrolyte, which can be here used, is any of $LiPF_6$, $LiBF_4$, $LiCF_3SO_3$, and a mixture thereof. The amount of the electrolyte salt to be dissolved in the non-aqueous solvent can be, for example, 0.5 to 2.0 mol/L.

<Separator>

The separator here used is, for example, a porous sheet having ion permeability and insulating properties. Examples of the porous sheet include a microporous thin film, a woven cloth, and an unwoven cloth. The material of the separator is suitably an olefin-based resin such as polyethylene or polypropylene, cellulose, or the like. The separator here used may be a stacked article having a cellulose fiber layer and a thermoplastic resin fiber layer of an olefin-based resin or the like, or may be a multilayer separator including a polyethylene layer and a polypropylene layer or may be one obtained by applying an aramid-based resin or a material such as ceramic to the surface of the separator.

EXAMPLES

Hereinafter, the present disclosure will be further described with reference to Examples, but the present disclosure is not intended to be limited to such Examples.

Example 1

[Production of Positive Electrode Active Material]

80 g of pure water was added to 100 g of a lithium metal composite oxide powder represented by $Li_{1.03}Ni_{0.91}Co_{0.045}Al_{0.045}O_2$ (average particle size of secondary particles: 12 μm), and the resultant was mixed for 5 minutes and then subjected to filtration and separation, thereby preparing a lithium metal composite oxide powder in which the water content was adjusted to 5%. Moreover, 1.19 g of tungsten oxide ($WO_3$) was added into an aqueous solution of 0.21 g of lithium hydroxide (LiOH) dissolved in 10 ml of pure water, and the resultant was stirred, thereby obtaining an alkali solution (W) containing tungsten.

Next, 2 g of an alkali solution (W) at 25° C. was sprayed with stirring of 100 g of the lithium metal composite oxide powder by use of a stirring apparatus (T.K. HIVIS MIX, manufactured by PRIMIX Corporation), thereby obtaining a mixture of the alkali solution (W) and the lithium metal composite oxide powder. The resulting mixture was placed in a firing vessel made of magnesia, thermally treated in vacuum with temperature rise to 180° C. at a rate of temperature rise of 3° C./min for 3 hours, and then subjected to furnace cooling to room temperature, thereby obtaining a positive electrode active material of Example 1.

The resulting positive electrode active material was analyzed by SEM/EDS, and it was thus confirmed that particles including W and Li were formed on surfaces of primary particles of lithium metal composite oxide. The tungsten content in the resulting positive electrode active material was analyzed by an ICP method, and was 0.1 mol % relative to the total number of moles of Ni, Co and Al.

Example 2

A positive electrode active material was produced in the same manner as in Example 1 except that 2 g of an alkali solution (W) at 70° C. was sprayed to 100 g of the lithium metal composite oxide powder. The resulting positive electrode active material was analyzed by SEM/EDS, and it was thus confirmed that particles including W and Li were formed on surfaces of primary particles of lithium metal composite oxide. The tungsten content in the resulting positive electrode active material was analyzed by an ICP method, and was 0.1 mol % relative to the total number of moles of Ni, Co and Al.

Example 3

A positive electrode active material was produced in the same manner as in Example 1 except that 0.3 g of an alkali solution (W) at 25° C. was sprayed to 100 g of the lithium metal composite oxide powder. The resulting positive electrode active material was analyzed by SEM/EDS, and it was thus confirmed that particles including W and Li were formed on surfaces of primary particles of lithium metal composite oxide. The tungsten content in the resulting positive electrode active material was analyzed by an ICP method, and was 0.03 mol % relative to the total number of moles of Ni, Co and Al.

Example 4

An alkali solution (W) containing tungsten was obtained by adding 0.476 g of tungsten oxide ($WO_3$) into an aqueous solution of 0.084 g of lithium hydroxide (LiOH) dissolved in 10 ml of pure water, and stirring the resultant. A positive electrode active material was produced in the same manner as in Example 1 except that 5 g of the alkali solution (W) at 70° C. was sprayed to 100 g of the lithium metal composite oxide powder. The resulting positive electrode active material was analyzed by SEM/EDS, and it was thus confirmed that particles including W and Li were formed on surfaces of primary particles of lithium metal composite oxide. The tungsten content in the resulting positive electrode active material was analyzed by an ICP method, and was 0.1 mol % relative to the total number of moles of Ni, Co and Al.

Comparative Example 1

A positive electrode active material was produced in the same manner as in Example 1 except that 0.5 g of a tungsten oxide powder was added to 100 g of the lithium metal composite oxide powder. The resulting positive electrode active material was analyzed by SEM/EDS, and it was thus confirmed that particles including W and Li were formed on surfaces of primary particles of lithium metal composite oxide. The tungsten content in the resulting positive electrode active material was analyzed by an ICP method, and was 0.2 mol % relative to the total number of moles of Ni, Co and Al.

Comparative Example 2

A positive electrode active material was produced in the same manner as in Example 1 except that 20 g of an alkali solution (W) at 25° C. was sprayed to 100 g of the lithium metal composite oxide powder. The resulting positive electrode active material was analyzed by SEM/EDS, and it was thus confirmed that particles including W and Li were formed on surfaces of primary particles of lithium metal composite oxide. The tungsten content in the resulting positive electrode active material was analyzed by an ICP method, and was 1.0 mol % relative to the total number of moles of Ni, Co and Al.

Comparative Example 3

The lithium metal composite oxide powder in which the water content was adjusted to 5% in Example 1 were placed in a firing vessel made of magnesia, thermally treated in vacuum with temperature rise to 180° C. at a rate of temperature rise of 3° C./min for 3 hours, and then subjected to furnace cooling to room temperature, thereby obtaining a positive electrode active material of Comparative Example 3.

[Production of Positive Electrode]

Ninety one parts by mass of the positive electrode active material of Example 1, 7 parts by mass of acetylene black as a conductive agent, and 2 parts by mass of polyvinylidene fluoride as a binder were mixed. The mixture was kneaded with a kneader (T.K. HIVIS MIX, manufactured by PRIMIX Corporation), thereby preparing a positive electrode mixture slurry. Next, the positive electrode mixture slurry was applied to aluminum foil having a thickness of 15 μm, and a coating film was dried, thereby forming a positive electrode active material layer on the aluminum foil. The resultant was adopted as a positive electrode of Example 1. The same manner was conducted to produce each positive electrode also in other Examples and Comparative Examples.

[Preparation of Non-Aqueous Electrolyte]

Ethylene carbonate (EC), methyl ethyl carbonate (MEC) and dimethyl carbonate (DMC) were mixed at a volume ratio of 3:3:4. Lithium hexafluorophosphate ($LiPF_6$) was dissolved in such a mixed solvent so that the concentration was 1.2 mol/L, and thus a non-aqueous electrolyte was prepared.

[Production of Test Cell]

The positive electrode of Example 1 and a negative electrode made of lithium metal foil were stacked so that such electrodes were opposite to each other with a separator being interposed therebetween, and the resultant was wound, thereby producing an electrode assembly. Next, the electrode assembly and the non-aqueous electrolyte were inserted into an outer package made of aluminum, thereby producing a test cell. The same manner was conducted to produce each test cell also in other Examples and Comparative Examples.

[Measurement of Initial Discharge Capacity]

After each of the test cells of Examples and Comparative Examples was subjected to constant current charge at a constant current of 0.2 C under an environmental temperature of 25° C. until the battery voltage reached 4.3 V, the test cell was subjected to constant voltage charge at 4.3 V until the current value reached 0.05 mA, and subjected to constant current discharge at a constant current of 0.2 C until the battery voltage reached 2.5 V. The discharge capacity here was measured. The result is shown as the initial discharge capacity in Table 1.

[Measurement of Discharge Capacity at Low Temperature]

Each of the test cells of Examples and Comparative Examples, subjected to the charge/discharge, was subjected to charge under an environmental temperature of 25° C. in the same conditions as described above, then retained under an environmental temperature of −30° C. for 30 minutes, and then subjected to discharge under an environmental temperature of −30° C. in the same conditions as described above. The discharge capacity here was measured, and the results thereof were shown in Table 1. The rate of improvement in discharge capacity at a low temperature, shown in Table 1, was obtained by assuming the discharge capacity at a low temperature of the test cell of Comparative Example 3 as 100% (basis) and relatively representing the discharge capacity at a low temperature of each of the test cells of other Examples and Comparative Examples.

TABLE 1

| | Composition of lithium metal composite oxide (mol %) | | | Alkali solution (W) | | Initial discharge capacity | Rate of improvement in discharge capacity at low temperature |
|---|---|---|---|---|---|---|---|
| | | | | Amount to be added | Temperature | | |
| | Ni | Co | Al | (wt %) | (° C.) | mAh/g | % |
| Example 1 | 91 | 4.5 | 4.5 | 2 | 25 | 215 | 125 |
| Example 2 | 91 | 4.5 | 4.5 | 2 | 70 | 215 | 140 |
| Example 3 | 91 | 4.5 | 4.5 | 0.3 | 25 | 215 | 120 |
| Example 4 | 91 | 4.5 | 4.5 | 5 | 70 | 214 | 140 |
| Comparative Example 1 | 91 | 4.5 | 4.5 | 0.5 Note: addition of $WO_3$ powder | — | 214 | 103 |
| Comparative Example 2 | 91 | 4.5 | 4.5 | 20 | 25 | 204 | 110 |
| Comparative Example 3 | 91 | 4.5 | 4.5 | — | — | 213 | 100 |

Each positive electrode active material used in Examples 1 to 3 was produced by performing the step of adding and mixing an alkali solution in which a tungsten compound was dissolved, to and with a lithium metal composite oxide powder having a high proportion of nickel and a proportion of cobalt of 10 mol % or less, in an amount of the alkali solution to be added which was in the range from 0.1 to 10% by mass relative to the lithium metal composite oxide powder. On the other hand, a positive electrode active material used in Comparative Example 1 was produced by adding and mixing a tungsten compound powder to and with a lithium metal composite oxide powder having a high proportion of nickel and a proportion of cobalt of 10 mol % or less, and a positive electrode active material used in Comparative Example 2 was produced by performing the step of adding and mixing an alkali solution in which a tungsten compound was dissolved, to and with a lithium metal composite oxide powder having a high proportion of nickel and a proportion of cobalt of 10 mol % or less, in an amount of the alkali solution to be added which was 20% by mass relative to the lithium metal composite oxide powder. In comparison of Examples 1 to 3 with Comparative Examples 1 to 2, Examples 1 to 3 each allowed the rate of improvement in discharge capacity at a low temperature to be significantly increased as compared with Comparative Examples 1 to 2. Example 2, in which the temperature of the alkali solution being added to the lithium metal composite oxide powder was 70° C., allowed the rate of improvement in discharge capacity at a low temperature to be most increased, among Examples 1 to 3.

Example 5

A positive electrode active material was produced in the same manner as in Example 1 except that a lithium metal composite oxide powder represented by $Li_{1.03}Ni_{0.91}Co_{0.06}Al_{0.03}O_2$ (average particle size of secondary particles: 12 μm) was used. The resulting positive electrode active material was analyzed by SEM/EDS, and it was thus confirmed that particles including W and Li were formed on surfaces of primary particles of lithium metal composite oxide. The tungsten content in the resulting positive electrode active material was analyzed by an ICP method, and was 0.1 mol % relative to the total number of moles of Ni Co and Al.

Example 6

A positive electrode active material was produced in the same manner as in Example 5 except that 2 g of an alkali solution (W) at 70° C. was sprayed to 100 g of the lithium metal composite oxide powder. The resulting positive electrode active material was analyzed by SEM/EDS, and it was thus confirmed that particles including W and Li were formed on surfaces of primary particles of lithium metal composite oxide. The tungsten content in the resulting positive electrode active material was analyzed by an ICP method, and was 0.1 mol % relative to the total number of moles of Ni, Co and Al.

Comparative Example 4

A positive electrode active material was produced in the same manner as in Example 5 except that 0.5 g of a tungsten oxide powder was added to 100 g of the lithium metal composite oxide powder. The resulting positive electrode active material was analyzed by SEM/EDS, and it was thus confirmed that particles including W and Li were formed on surfaces of primary particles of lithium metal composite oxide. The tungsten content in the resulting positive electrode active material was analyzed by an ICP method, and was 0.2 mol % relative to the total number of moles of Ni. Co and Al.

Comparative Example 5

The lithium metal composite oxide powder in which the water content was adjusted to 5% in Example 5 was placed in a firing vessel made of magnesia, thermally treated in vacuum with temperature rise to 180° C. at a rate of temperature rise of 3° C./min for 3 hours, and then subjected to furnace cooling to room temperature, thereby obtaining a positive electrode active material of Comparative Example 5.

Each test cell of Examples 5 and 6 and Comparative Examples 4 and 5 was subjected to charge/discharge in the same conditions as described above, and the initial discharge capacity and the discharge capacity at a low temperature were measured. The results are shown in Table 2. The rate of improvement in discharge capacity at a low temperature, shown in Table 2, was obtained by assuming the discharge capacity at a low temperature of the test cell of Comparative Example 5 as 100% (basis) and relatively representing the discharge capacity at a low temperature of each of the test cells of other Examples and Comparative Examples.

alkali solution being added to the lithium metal composite oxide powder was 70° C., allowed the rate of improvement in discharge capacity at a low temperature to be most increased, among Examples 5 to 6.

Example 7

A positive electrode active material was produced in the same manner as in Example 1 except that a lithium metal composite oxide powder represented by $Li_{1.03}Ni_{0.92}Co_{0.02}Al_{0.05}Mn_{0.01}O_2$ (average particle size of secondary particles: 12 μm) was used. The resulting positive electrode active material was analyzed by SEM/EDS, and it was thus confirmed that particles including W and Li were formed on surfaces of primary particles of lithium metal composite oxide. The tungsten content in the resulting positive electrode active material was analyzed by an ICP method, and was 0.1 mol % relative to the total number of moles of Ni, Co and Al.

Example 8

A positive electrode active material was produced in the same manner as in Example 7 except that 2 g of an alkali solution (W) at 70° C. was sprayed to 100 g of the lithium metal composite oxide powder. The resulting positive electrode active material was analyzed by SEM/EDS, and it was thus confirmed that particles including W and Li were formed on surfaces of primary particles of lithium metal composite oxide. The tungsten content in the resulting

TABLE 2

| | Composition of lithium metal composite oxide (mol %) | | | Alkali solution (W) | | Initial discharge capacity | Rate of improvement in discharge capacity at low temperature |
|---|---|---|---|---|---|---|---|
| | Ni | Co | Al | Amount to be added (wt %) | Temperature (° C.) | mAh/g | % |
| Example 5 | 91 | 6 | 3 | 2 | 25 | 217 | 115 |
| Example 6 | 91 | 6 | 3 | 2 | 70 | 217 | 125 |
| Comparative Example 4 | 91 | 6 | 3 | 0.5 Note: addition of $WO_3$ powder | — | 216 | 102 |
| Comparative Example 5 | 91 | 6 | 3 | — | — | 216 | 100 |

Each positive electrode active material used in Examples 5 to 6 was produced by performing the step of adding and mixing an alkali solution in which a tungsten compound was dissolved, to and with a lithium metal composite oxide powder having a high proportion of nickel and a proportion of cobalt of 10 mol % or less, in an amount of the alkali solution to be added which was in the range from 0.1 to 10% by mass relative to the lithium metal composite oxide powder. On the other hand, a positive electrode active material used in Comparative Example 4 was produced by adding and mixing a tungsten compound powder to and with a lithium metal composite oxide powder having a high proportion of nickel and a proportion of cobalt of 10 mol % or less. In comparison of Examples 5 to 6 with Comparative Example 4. Examples 5 to 6 each allowed the rate of improvement in discharge capacity at a low temperature to be significantly increased as compared with Comparative Example 4. Example 6, in which the temperature of the positive electrode active material was analyzed by an ICP method, and was 0.1 mol % relative to the total number of moles of Ni, Co and Al.

Comparative Example 6

A positive electrode active material was produced in the same manner as in Example 7 except that 0.5 g of a tungsten oxide powder was added to 100 g of the lithium metal composite oxide powder. The resulting positive electrode active material was analyzed by SEM/EDS, and it was thus confirmed that particles including W and Li were formed on surfaces of primary particles of lithium metal composite oxide. The tungsten content in the resulting positive electrode active material was analyzed by an ICP method, and was 0.2 mol % relative to the total number of moles of Ni, Co and Al.

Comparative Example 7

The lithium metal composite oxide powder in which the water content was adjusted to 5% in Example 7 was placed in a firing vessel made of magnesia, thermally treated in vacuum with temperature rise to 180° C. at a rate of temperature rise of 3° C./min for 3 hours, and then subjected to furnace cooling to room temperature, thereby obtaining a positive electrode active material of Comparative Example 7.

Each test cell of Examples 7 and 8 and Comparative Examples 6 and 7 was subjected to charge/discharge in the same conditions as described above, and the initial discharge capacity and the discharge capacity at a low temperature were measured. The results are shown in Table 3. The rate of improvement in discharge capacity at a low temperature, shown in Table 3, was obtained by assuming the discharge capacity at a low temperature of the test cell of Comparative Example 7 as 100% (basis) and relatively representing the discharge capacity at a low temperature of each of the test cells of other Examples and Comparative Examples.

TABLE 3

| | Composition of lithium metal composite oxide (mol %) | | | | Alkali solution (W) | | Initial discharge capacity | Rate of improvement in discharge capacity at |
|---|---|---|---|---|---|---|---|---|
| | | | | | Amount to be added | Temperature | | low temperature |
| | Nt | Co | Al | Mn | (wt %) | (° C.) | mAh/g | % |
| Example 7 | 92 | 2 | 5 | 1 | 2 | 25 | 213 | 135 |
| Example 8 | 92 | 2 | 5 | 1 | 2 | 70 | 213 | 150 |
| Comparative Example 6 | 92 | 2 | 5 | 1 | 0.5 Note: addition of $WO_3$ powder | — | 213 | 105 |
| Comparative Example 7 | 92 | 2 | 5 | 1 | — | — | 213 | 100 |

Each positive electrode active material used in Examples 7 to 8 was produced by performing the step of adding and mixing an alkali solution in which a tungsten compound was dissolved, to and with a lithium metal composite oxide powder having a high proportion of nickel and a proportion of cobalt of 10 mol % or less, in an amount of the alkali solution to be added which was in the range from 0.1 to 10% by mass relative to the lithium metal composite oxide powder. On the other hand, a positive electrode active material used in Comparative Example 6 was produced by adding and mixing a tungsten compound powder to and with a lithium metal composite oxide powder having a high proportion of nickel and a proportion of cobalt of 10 mol % or less. In comparison of Examples 7 to 8 with Comparative Example 6. Examples 7 to 8 each allowed the rate of improvement in discharge capacity at a low temperature to be significantly increased as compared with Comparative Example 6. Example 8, in which the temperature of the alkali solution being added to the lithium metal composite oxide powder was 70° C., allowed the rate of improvement in discharge capacity at a low temperature to be most increased, among Examples 7 to 8.

Reference Example 1

[Production of Positive Electrode Active Material]

A positive electrode active material was produced in the same manner as in Example 1 except that 0.5 g of a tungsten oxide powder was added to 100 g of a lithium metal composite oxide powder represented by $Li_{1.03}Ni_{0.82}Co_{0.15}Al_{0.03}O_2$ (average particle size of secondary particles: 12 μm). The resulting positive electrode active material was analyzed by SEM/EDS, and it was thus confirmed that particles including W and Li were formed on surfaces of primary particles of lithium metal composite oxide. The tungsten content in the resulting positive electrode active material was analyzed by an ICP method, and was 0.2 mol % relative to the total number of moles of Ni, Co and Al. A test cell was produced in the same manner as in Example 1 except that the resulting positive electrode active material was used.

Reference Example 2

A positive electrode active material was produced in the same manner as in Example 1 except that 2 g of an alkali solution (W) at 70° C. was added to 100 g of a lithium metal composite oxide powder represented by $Li_{1.03}Ni_{0.82}Co_{0.15}Al_{0.03}O_2$ (average particle size of secondary particles: 12 μm). The resulting positive electrode active material was analyzed by SEM/EDS, and it was thus confirmed that particles including W and Li were formed on surfaces of primary particles of lithium metal composite oxide. The tungsten content in the resulting positive electrode active material was analyzed by an ICP method, and was 0.2 mol % relative to the total number of moles of Ni, Co and Al. A test cell was produced in the same manner as in Example 1 except that the resulting positive electrode active material was used.

Reference Example 3

A test cell was produced in the same manner as in Example 1 except that a lithium metal composite oxide powder represented by $Li_{1.03}Ni_{0.82}Co_{0.15}Al_{0.03}O_2$ was used for a positive electrode active material.

Each of the test cells of Reference Examples was subjected to charge/discharge in the same conditions as described above, and the initial discharge capacity and the discharge capacity at a low temperature were measured. The results are shown in Table 2. The rate of improvement in discharge capacity at a low temperature, shown in Table 2, was obtained by assuming the discharge capacity at a low temperature of the test cell of Reference Example 3 as 100% and relatively representing the discharge capacity at a low temperature of each of the test cells of other Reference Examples.

TABLE 4

| | Composition of lithium metal composite oxide (mol %) | | | Alkali solution (W) | | Initial discharge capacity | Rate of improvement in discharge capacity at low temperature |
|---|---|---|---|---|---|---|---|
| | Ni | Co | Al | Amount to be added (wt %) | Temperature (° C.) | mAh/g | % |
| Reference Example 1 | 82 | 15 | 3 | 0.5 Note: addition of WO₃ powder | — | 206 | 102 |
| Reference Example 2 | 82 | 15 | 3 | 10 | 70 | 206 | 102 |
| Reference Example 3 | 82 | 15 | 3 | — | — | 205 | 100 |

A positive electrode active material used in Reference Example 1 was produced by adding and mixing a tungsten compound powder to and with a lithium metal composite oxide powder having a high proportion of nickel and a proportion of cobalt of more than 10 mol %, and a positive electrode active material used in Reference Example 2 was produced by performing the step of adding and mixing an alkali solution in which a tungsten compound was dissolved, to and with a lithium metal composite oxide powder having a high proportion of nickel and a proportion of cobalt of 10 mol % or more, in an amount of the alkali solution to be added which was 2% by mass relative to the lithium metal composite oxide powder. Each of Reference Examples 1 to 2 did not allow the rate of improvement in discharge capacity at a low temperature to be significantly increased, as shown in Table 2.

The invention claimed is:

1. A method for producing a positive electrode active material for a non-aqueous electrolyte secondary battery, comprising:
  a first step of adding and mixing an alkali solution in which a tungsten compound is dissolved, to and with a lithium metal composite oxide powder made of primary particles represented by general formula $Li_zNi_{1-x-y}Co_xM_yO_2$, wherein $0 \leq x \leq 0.1$, $0 \leq y \leq 0.1$ and $0.97 \leq z \leq 1.20$, and M is at least one element selected from the group consisting of Mn, W, Mg, Mo, Nb, Ti, Si and Al, and secondary particles formed by aggregation of the primary particles, and
  a second step of thermally treating the alkali solution and the lithium metal composite oxide powder mixed, at a temperature of 100 to 600° C., wherein
  an amount of the alkali solution to be added in the first step is 0.1 to 10% by mass relative to the lithium metal composite oxide powder, and
  a temperature of the alkali solution being added to the lithium metal composite oxide powder in the first step is in the range from 60 to 90° C.

2. The method for producing a positive electrode active material for a non-aqueous electrolyte secondary battery according to claim 1, wherein the lithium metal composite oxide powder is represented by general formula $Li_zNi_{1-x-y}Co_xM_yO_2$, wherein $0 \leq x \leq 0.06$, $0 \leq y \leq 0.1$ and $0.97 \leq z \leq 1.20$, and M is at least one element selected from the group consisting of Mn, W, Mg, Mo, NbTi, Si and Al.

3. The method for producing a positive electrode active material for a non-aqueous electrolyte secondary battery according to claim 1, comprising, before the first step, a step A of mixing the lithium metal composite oxide powder with water and then subjecting the mixture to solid-liquid separation.

* * * * *